United States Patent [19]

Kang

[11] 3,821,527

[45] June 28, 1974

[54] METHOD AND APPARATUS FOR WALSH FUNCTION FILTERING

[75] Inventor: George S. Kang, Silver Spring, Md.

[73] Assignee: The Bunker-Ramo Corporation, Oak Brook, Ill.

[22] Filed: Oct. 4, 1971

[21] Appl. No.: 185,962

[52] U.S. Cl. .............................................. 235/152

[51] Int. Cl. ............................................ G06f 15/34

[58] Field of Search ........ 235/152, 156; 179/15 BC; 328/167

[56] References Cited

OTHER PUBLICATIONS

H. Gethoffer, "Sequency Analysis Using Correlation and Convolution," IEEE Trans. on Electromagnetic Compatability, Vol. EMC-13, Aug. 1971, pp. 118–123.

H. Gethoffer, "Sequency Analysis Using Correlation and Convolution," Application of Walsh Functions 1971 Proceedings, Apr. 1971, pp. 118–123.

G. Graham Murray, "Digital Walsh Filter Design," Applications of Walsh Functions 1971 Proceedings, Apr. 1971, pp. 101–105.

H. F. Harmuth, "Applications of Walsh Functions in Communications," IEEE Spectrum, Nov. 1969, pp. 82–91.

*Primary Examiner*—Malcolm A. Morrison
*Assistant Examiner*—David H. Malzahn
*Attorney, Agent, or Firm*—N. Cass; F. M. Arbuckle

[57] ABSTRACT

A method and apparatus for generating running Walsh series expansion coefficients and for utilizing these coefficients to perform Walsh function filtering. An input signal is sampled, and the N most recent sampled values are commutatively stored. The stored sampled values are operated upon by a suitable means to generate N Walsh coefficients of the sampled input. Each of the generated Walsh coefficients is multiplied $(-1)^n$. The outputs from the multipliers are the N running Walsh coefficients for the received input. The weighted sum of the outputs from the multipliers may also be formed. By controlling the weighting values, digital filtering may be performed.

12 Claims, 6 Drawing Figures

PATENTED JUN 28 1974

3,821,527

SHEET 2 OF 4

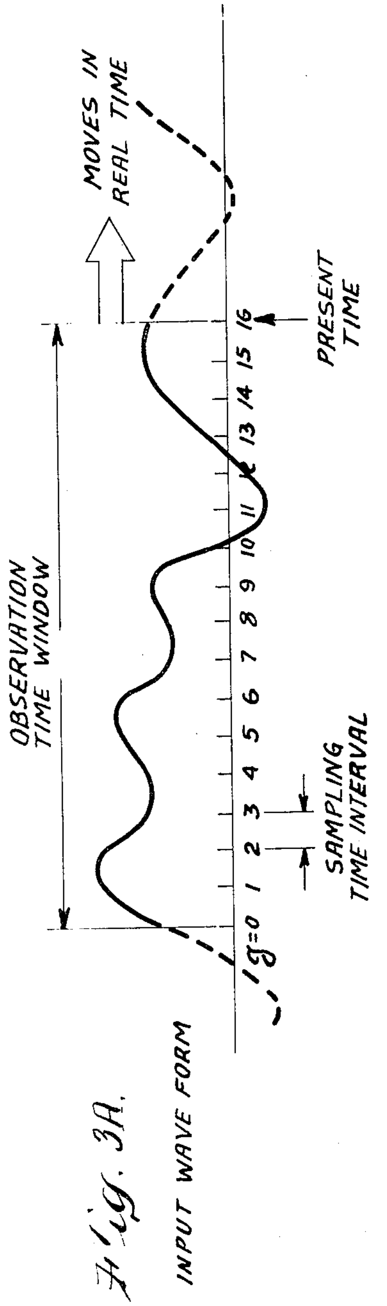
Fig. 3A. INPUT WAVE FORM
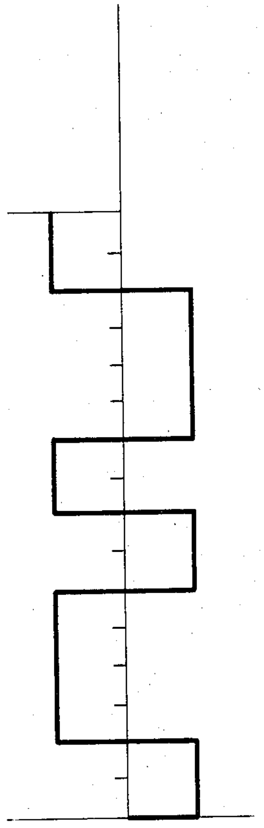
Fig. 3B. CONVOLVED WALSH FUNCTION, $W_5(z)$
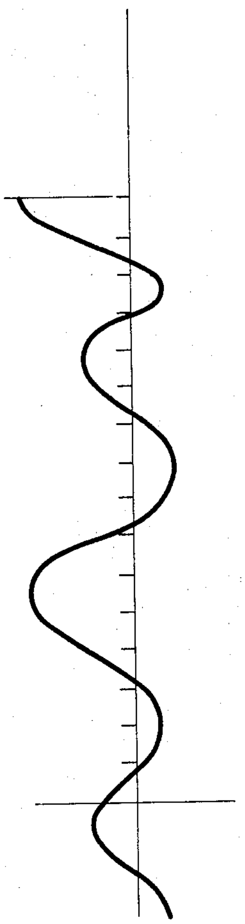
Fig. 3C. OUTPUT OF WALSH FILTER, $V_{0,5}(z)$

METHOD AND APPARATUS FOR WALSH FUNCTION FILTERING

This invention relates to methods and apparatus for performing Walsh function filtering and more particularly to the generating of running Walsh filter coefficients of an input signal and to the utilizing of these coefficients for the Walsh function filtering of the signal.

BACKGROUND OF THE INVENTION

In order to identify or otherwise process a given signal, it is necessary that the signal be characterized in some manner. The signal to be characterized may, for example, be a waveform representing speech where speaker or word identification is desired, or the signal may be from an electronic transmitter such as a radio or radar transmitter which is to be identified and classified for jamming or other purposes. One method which has been extensively employed in the past for performing these operations is to utilize a Fourier filter to generate the Fourier coefficients of the signal which coefficients may then be utilized to characterize the signal. For continuous waveforms such as speech, a running filter is required.

While Fourier filters generate a useful set of coefficients for these applications, the generation of these coefficients involves operations with sine and cosine waves and thus necessitates operation with complex functions having both real and imaginary terms. As a result, the circuits utilized for generating the required coefficients, for example the fast Fourier transform circuits, are relatively complicated and expensive. Further, the number of coefficients generally required in order to fully characterize a waveform using Fourier functions is normally equal to the number of samples taken of the signal when sampling the signal at the Nyquist rate. Since the Nyquist rate is $\frac{1}{2}\omega$; a relatively large number of samples are required for high bandwidth signals. For example, nearly twenty coefficients might be required in order to fully represent a decaying exponential function.

By contrast, Walsh transforms involve manipulations with square waves and thus do not require operation with complex functions. Circuits for generating Walsh coefficients (i.e., fast Walsh transform circuits or the like) therefore, as will be seen later, require only the use of simple sum and difference circuits. These circuits are thus far less complex, and thus less expensive, than the comparable Fourier transform circuits. Further, the number of Walsh coefficients required to represent a function will never be greater than the number of Fourier coefficients required and will, in some instances, be substantially less. For example, for the decaying exponential function previously mentioned, only five Walsh coefficients would suffice to represent the function as opposed to the nearly twenty coefficients previously indicated for the Fourier function.

The advantages indicated above for using a Walsh function to generate coefficients rather then a Fourier function, also apply in applications where a first function is to be converted into a second function by passing it through a filter having the transform impulse response. One such application is in the equalization of a transmission line where the filter impulse response is the inverse of the line impulse response so that the output from the filter is the original signal as applied to the line with distortions introduced by the line equalized out.

Heretofore, equalizers have generally utilized a transversal filter, the weighted tap outputs from which are summed to obtain the desired signal. A variety of known algorithms are available for setting the tap weights. It has been found that in some applications where a transversal filter is utilized, the number of weighted taps required may be significantly reduced, and the overall circuitry simplified, by substituting a circuit for generating Walsh filter coefficients for the transversal filter, weighting the Walsh filter coefficients, and summing the resulting values. Again, the weights to obtain the desired impulse response for the filter may be derived using a variety of known algorithms. The resulting Walsh function filter is a key element of the applicant's invention.

It is therefore a primary object of this invention to provide an improved circuit for extracting coefficients from a signal.

A more specific object of this invention is to provide a circuit of the type indicated above which in some applications requires the generation of less parameters to characterize a signal than is presently required.

Another more specific object of this invention is to provide a circuit of the type indicated above which is simplier and less expensive than existing circuits.

A still more specific object of the invention is to provide a circuit which utilizes the parameters generated above to convert a received signal into a desired output signal.

A feature of this invention is the generating of running Walsh function coefficients of a received input signal.

A more specific feature of this invention is the utilizing of the coefficients generated above as part of a Walsh function filter.

BRIEF DESCRIPTION OF INVENTION

In accordance with the above objects and features, this invention provides a method and apparatus for generating the Nth running Walsh filter coefficient of an input signal. The input signal is sampled by a suitable means. During each sampling interval, a means is provided for performing convolution summation between the Nth Walsh function and the sampled input signal. Each summation yields the Nth Walsh filter coefficient for a selected time window of the input signal. In performing the convolution summation, the input signal samples are communtatively stored in a suitable means. The term "communtatively storing" and like terms are used herein to refer to the distributing of the input signal samples to respective ones of a plurality of storage means during the sampling operation. For example, in the preferred embodiment to be described herein, the input signal is sequentially sampled and as each sample becomes available it is stored in a respective sample and hold circuit. During each sampling interval, the stored sample values are utilized to generate the (N) Walsh coefficients of the input signal for the time window represented by the stored samples. Each coefficient is then multiplied by $(-1)^n$. Where Walsh function filtering is desired, a set of Walsh functions is obtained as a result of each convolution summation operation, the set representing a selected group of the running Walsh filter coefficients of the received input, and each of the sets of coefficients is weighted and summed by suitable means.

The foregoing and other objects, features and advantages of the invention will be apparent from the following more particular description of a preferred embodiment of the invention as illustrated in the accompanying drawings.

BRIEF DESCRIPTION OF DRAWINGS

FIGS. 3A, 3B, 3C and 4 are waveform diagrams useful in describing the operation of the invention.

DETAILED DESCRIPTION OF THE INVENTION

Mathematical Discussion

Figure 1:
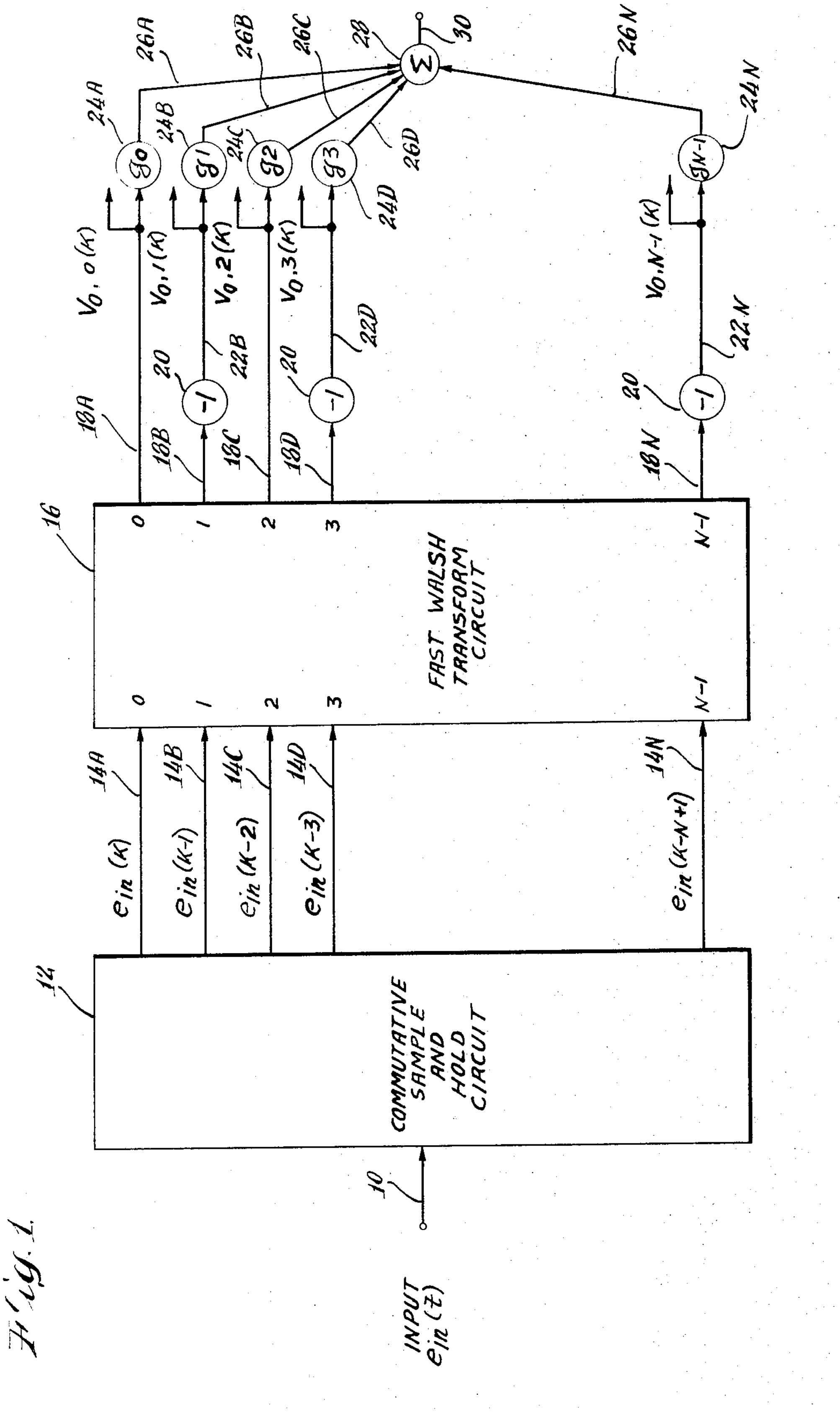
FIG. 1 is a schematic block diagram of a preferred embodiment of the invention.

By definition a Walsh filter is a linear filter whose impulse response is one cycle of a Walsh function, a complete Walsh function set consisting of N number of filters whose impulse response is $$y_n(t) = \begin{cases} W_n(t) & \text{for } 0 \leq t < 1 \\ 0 & \text{Otherwise} \end{cases} \quad (1)$$

where $W_n(t)$ is the $n^{th}$ Walsh function, and the period of $W_n(t)$ is normalized to unity. The sampled sequence of $Y_n(t)$ is expressed by $$y_n(j) = \begin{cases} W_n(j) & \text{for } j = 0, 1, 2, \ldots, N-1 \\ 0 & \text{Otherwise} \end{cases} \quad (2)$$

In as much as a Walsh filter is a linear filter, it performs convolution summation, just as any linear filter. Thus, the output of the $n^{th}$ Walsh filter caused by an input signal $e_{in}(j)$ is $$v_{o,n}(k) = \frac{1}{N} \sum_{j=0}^{k} e_{in}(k-j) y_n(j) \quad (3)$$

where $j$ is a dummy variable for summation, and $k$ is a present time index.

Expressing $Y_n(j)$ in terms of $W_n(j)$ as expressed by Equation 2, Equation 3 reduces to $$v_{o,n}(k) = \frac{1}{N} \sum_{j=k-N+1}^{k} e_{in}(k-j) W_n(j) \quad (4)$$

For convolution summation the arguments of $e_{in}(.)$ and $W_n(.)$ may be interchanged. Thus, Eq. 4 is equivalent to $$v_{o,n}(k) = \frac{1}{N} \sum_{j=k-N+1}^{k} e_{in}(j) W_n(k-j) \quad (5)$$

Figure 4:
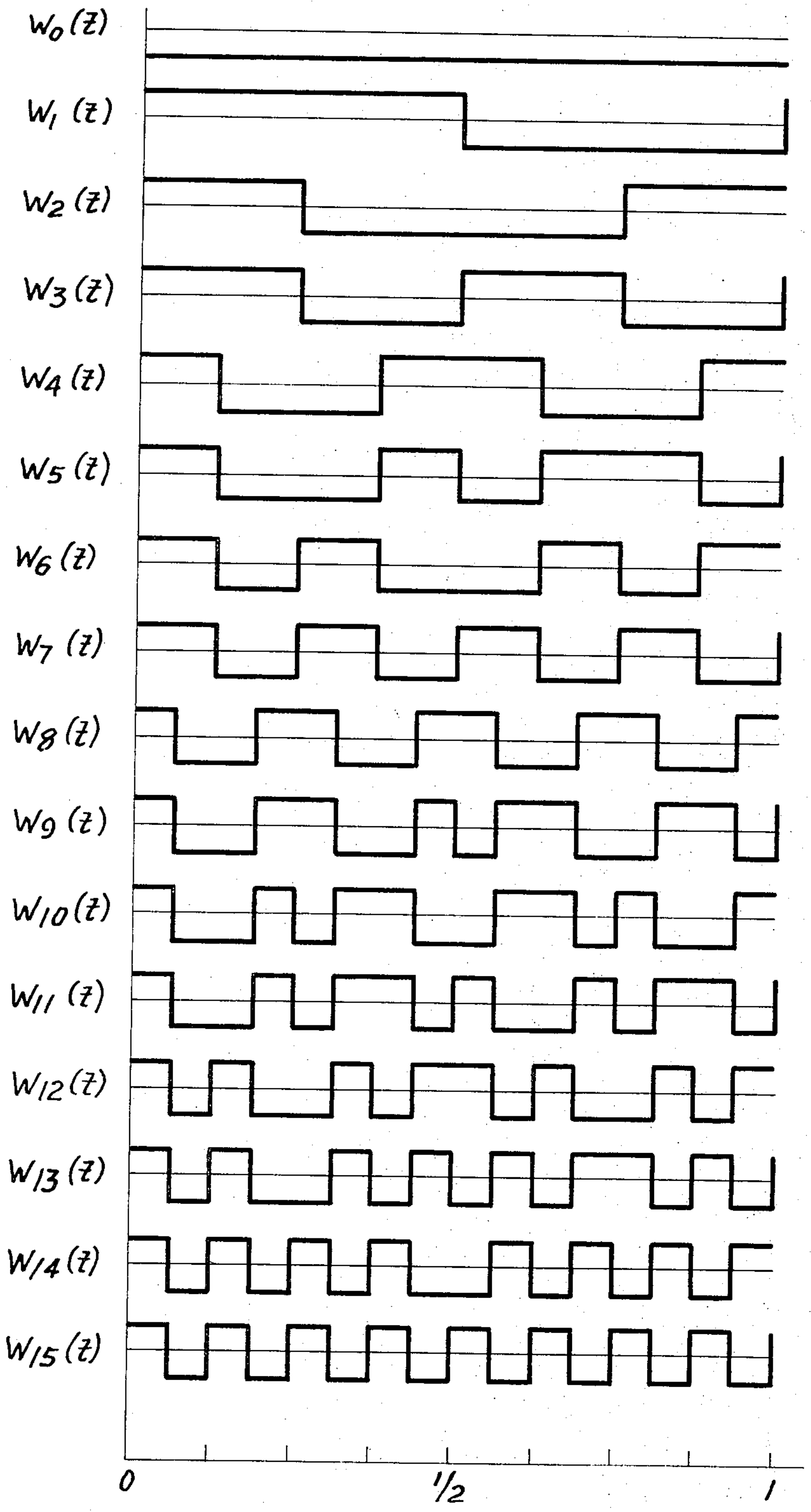

If the Walsh functions are so arranged that the increase of the index $(n)$ corresponds to the increase in the average number of zero-crossings with an alternating sequence of even and odd symmetries (i.e., the Walsh functions arranged as by Harmuth,) as shown in FIG. 4 for $n = 0$ through $n = 15$, the following relationship holds:

$$W_n(k-j) = (-1)^n W_n(j-k) \quad (6)$$

Equation 6 holds because $W_n(j)$ is an even sequence if $n$ is even, and an odd sequence if $n$ is odd. Substituting Eq. 6 into Eq. 5 yields $$v_{o,n}(k) = (-1)^n \left\{ \frac{1}{N} \sum_{j=k+N-1}^{k} e_{in}(j) W_n(j-k) \right\} \quad (7)$$

The quantity inside the bracket is the $n^{th}$ Walsh coefficient of the input measured at the $k^{th}$ time instant (i.e., the present time), in which the Walsh coefficients is computed from the N number of input samples taken from the immediate past of the present. As noted for Eqs. 1 and 2, the N number of samples stems from one period of the Walsh function. Thus, Eq. 7 can be written as $$v_{o,n}(k) = (-1)^n \ (n^{th} \text{ running Walsh coefficients}) \quad (8)$$

in which the expansion period is one cycle of the Walsh function extending from the present to the past.

FIGS. 3A, 3B and 3C are pictorial representations of Equation 7 with $(W_n = W_5)$. Referring to FIG. 3A, it is assumed that the bandwidth of the input signal being operated upon is such that sixteen samples are required within the selected observation time window in order to fully characterize the waveform. At each sample time, the observation time window moves one sampling time interval to the right with a new sample on the right moving into the window and the left-most old sample moving out of the window. Note that if N is even, the convolved Walsh function when read from $t = 0$ to $t = 1$, is the same as the unconvolved function (shown in FIG. 4,) when read from $t = 1$ to $t = 0$. However, the convolution of an odd Walsh function is the inverse of the unconvolved Walsh function. This is the reason for the $(-1)^n$ term in Equations 7 and 8.

FIG. 3B shows the convolved Walsh function for $W_5(t)$. Comparing this convolved function with the function shown for $W_5(t)$ in FIG. 4, it is seen that the plus-minus reversal indicated above has in fact occurred. FIG. 3C indicates the $v_{0,5}(t)$ term which as may be seen from Equation 7, is the integrated value of the product of the functions of FIGS. 3A and 3B.

One useful application for the running Walsh filter coefficients generated from Equations 7 and 8 is in a Walsh weighted filter, or Walsh function filter, which is a general class of linear filter whose impulse response is synthesized from a Walsh series (i.e., a weighted sum of all Walsh functions). Since a Walsh filter is a linear filter, it performs convolution integral (or convolution summation for a sample-data process).

Any stable linear network has an impulse response square integrable, and vanishes as time increases. Thus, such an impulse response can be expanded into a Walsh series.

$$h(t) = \begin{cases} \sum_{n=0}^{N-1} g_n W_n(t) & 0 \leqq t = 1 \\ 0 & \end{cases} \quad (9)$$

where $h(t)$ is the impulse response of a specified network, and $g_n$ is the $n^{th}$ expansion coefficient. Again, the expansion period which corresponds to the impulse response duration is normalized to unity. Certain impulse responses (such as a decaying exponential) last indefinitely, at least in theory. In practice, however, the impulse response duration can be regarded as the time interval for which magnitude decreases to around 60 dB below the peak value.

The sampled sequence of the impulse response expressed by Equation 9 is $$h(j)=\begin{cases}\sum_{n=0}^{N-1} g_n W_n(j) & j=0, 1, 2, \ldots, N-1 \\ 0 & \text{otherwise}\end{cases} \quad (10)$$

for a specified impulse response, $g_n$ is computed from $$g_n=\frac{1}{N}\sum_{j=0}^{N-1} h(j)W_n(j) \qquad n=0, 1, 2, \ldots, N-1 \quad (11)$$

As discussed previously, a Walsh filter is a linear filter whose impulse response is one cycle of a Walsh function. The impulse response of a Walsh filter is expressed by Equation 2. Combining Equation 2 and Equation 10 yields the impulse response of a Walsh-weighted filter as a weighted sum of Walsh filters. Thus, $$h(j)=\sum_{n=0}^{N-1} g_n y_n(j) \qquad j=0, 1, 2, \ldots, N-1 \quad (12)$$

where $y_n(j)$ is the sampled sequence of the Walsh filter impulse response.

Detailed Hardware Description

FIG. 1 is a block diagram of a circuit for performing the functions indicated by Equations 7, 8 and 12. From FIG. 1, it is seen that the input signal on line 10 is applied to a commutative sample and hold circuit 12. This circuit samples the signal on line 10, at for example, the Nyquist rate for the received signal and stores each new sample in the upper-most of the sample and hold circuits (i.e., the circuit feeding line 14A). As the most recent sample is stored in the upper-most sample and hold circuit, the value in this circuit and in each succeeding sample and hold circuit is transferred down one position to the succeeding sample and hold circuit. The value in the lower-most or $N^{th}$ sample and hold circuit is lost. Circuit 12 thus contains the N most recent samples of the input signal at any given instant of time. Stated another way, circuit 12 contains the samples for the observation time window shown in FIG. 3A. The sample values stored in circuits 12 are applied through corresponding lines 14 to a fast Walsh transform circuit 16.

Figure 2:
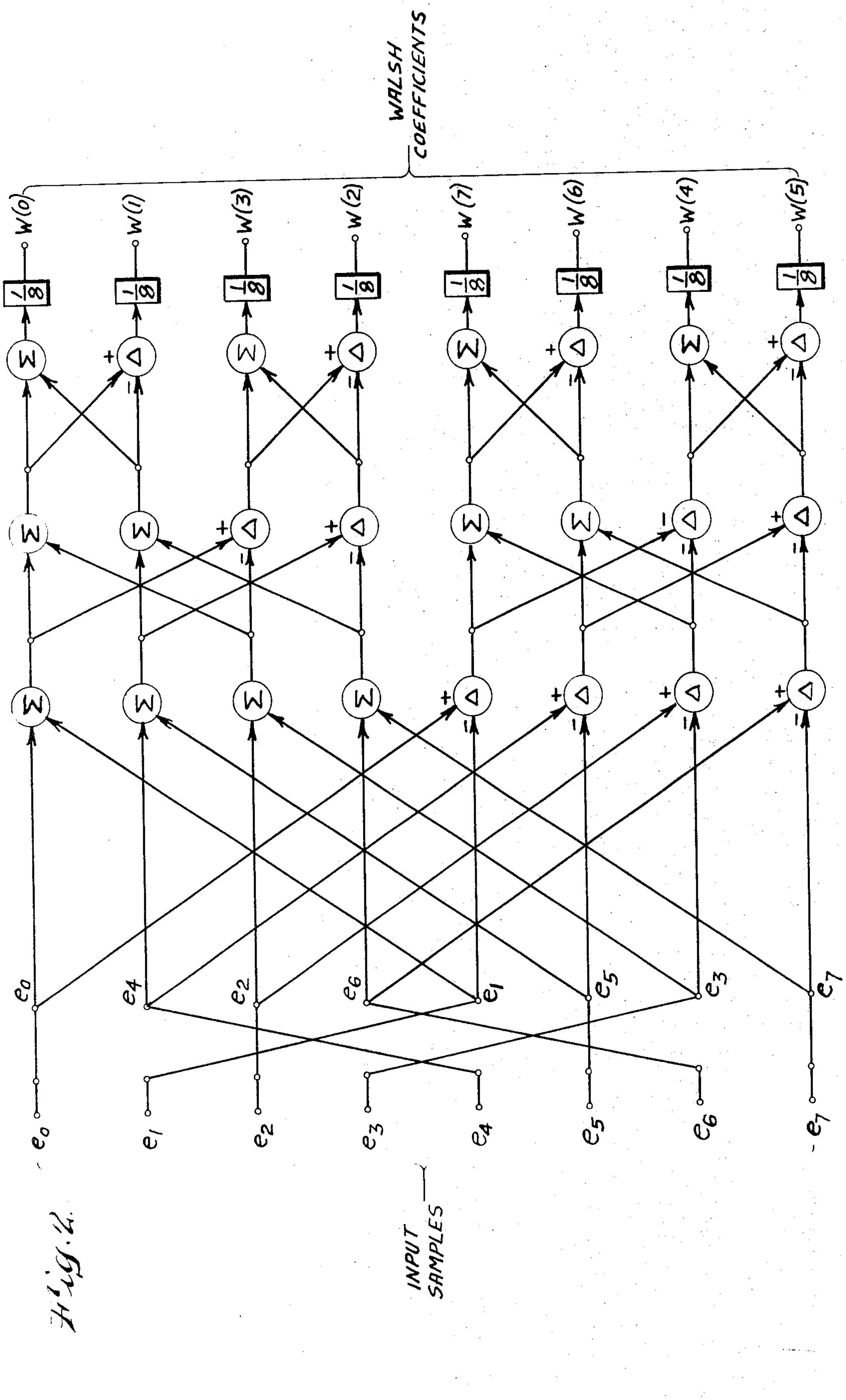
FIG. 2 is a schematic block diagram of a fast Walsh transform circuit suitable for use in the embodiment of the invention shown in FIG. 1.

The fast Walsh transform circuit 16 does not form part of the present invention. However, a circuit suitable for performing this function for N = 8 is shown in FIG. 2. In reviewing this circuit, it should be appreciated that the Walsh transform relates N number of input samples to N number of Walsh coefficients. The Walsh transform can be expressed by a matrix equation, where column matrices represent the input sample sequence and a column matrix representing Walsh coefficients are related by an N by N transform matrix. The elements in the $k^{th}$ row of the transform matrix are determined by the sample values of the $k^{th}$ Walsh function, where the sampling rate is the zero-crossing rate of the $N^{th}$ Walsh function. Since the amplitude of all Walsh functions are either plus 1 or minus 1, all elements of the transform matrix are also either plus 1 or minus 1.

Thus, the Walsh transform is a summation process, and each Walsh coefficient is a simple sum (i.e., without weighting) of various input sample values. The total number of summation operations indicated by the matrix equation would normally be $N^2$. However, it turns out that because of symmetry, a number of redundant computations are not required. The fast Walsh transform circuit shown, for example, in FIG. 2 eliminates all redundant commutations reducing the number of summation operations from $N^2$ to N ($\log_2 N$) which operations are carried out in N successive stations. Each stage contains $\log_2 N$ summing operations. Since the circuit of FIG. 2 does not form part of the present invention, and since the operation is easily preceived from the drawing, the operation of this circuit will not be described in detail herein. However, it is noted that the output for each term is divided by N where N is the number of samples. For FIG. 2, N is equal to 8. It is also noted that there is a systematic arrangement of the adders and subtractors in the circuit. If each adder is denoted by a zero and each subtractor by a one, it is seen that the binary value for each row corresponds to its level. This systematic arrangement of summers facilitates the expanding of the fast Walsh algorithm for larger values of N.

From Equation 8, it is seen that to obtain $V_{o,n}(k)$ the running Walsh coefficients obtained from fast Walsh transform circuit 16 must be multiplied by $(-1)^N$. Thus, each of the odd function outputs on lines 18 from circuit 16 are multiplied by minus 1 in a suitable multiplication circuit 20. The signals on the even numbered lines 18 and on the lines 22 for the odd numbered functions are the desired running Walsh filter coefficients of the input signal on line 10. These coefficients may be utilized to characterize the signal for identification or other purposes or may be utilized in other applications where coefficients of an input function are required.

If it is desired to filter the signal on line 10 to obtain an output function which is related to the function on line 10 in a predetermined way, then the $V_{o,n}(k)$ functions on lines 18 and 22 are weighted in weighting circuits 24. Weighting circuits 24 could for example be simple variable attenuation circuits or other simple multiplication circuits. The weighting values would depend on the desired impulse response of the filter and may be determined either mathematically from equation 11 or by use of other known techniques. The outputs from weighting circuits 24 on lines 26 are summed in summing circuit 28. The resulting outputs on line 30 are succeeding samples of the desired filtered output. These sample values may be converted into a smooth curve by use of known filtering techniques.

In addition to the weighting circuits 24 shown in FIG. 1, the sample sequence appearing at the commutative sample and hold outputs (i.e., on lines 14) may be window-weighted, as is often done for running Fourier transform. Window-weighting provides an effect similar to filtering of the input prior to transform. The filtering characteristics are determined by the window-weighting function (i.e., the gain distribution or the gain profile). Normally, the window-weighting functions are symmetric with respect to the window center, being maximum at the center. One of the objectives for incorporating a window-weighting function is to surpress spectral sidelobes created by a time-limited observation window. Where a weighted Walsh function filter of the type shown in FIG. 1 is utilized, the window weights may be incorporated into the weights of circuits 24 so as to permit both weighting functions to be carried out in a single circuit.

In the discussion above, the expansion period which corresponds to the impulse response for the Walsh functions has been normalized to unity. If the expansion period is not unity, as is generally the case, (i.e., $T \neq 1$), the amplitudes of the Walsh functions are made either $+1\ \sqrt{T}$ or $-1\ \sqrt{T}$.

A simple and inexpensive circuit has thus been provided for generating running Walsh filter coefficients and for utilizing these coefficients to perform the Walsh weighted filter function. While specific circuits have been shown or described for performing these functions, it is apparent that other circuits satisfying the generated equations might be utilized for performing these functions and that at least some of the functions might be performed by use of a programmed general purpose computer.

Thus, while the invention has been particularly shown and described with reference to a preferred embodiment thereof, it will be understood by those skilled in the art that the foregoing and other changes in form and details may be made therein without departing from the spirit and scope of the invention.

What is claimed is:

1. A Walsh function filter comprising:

means for sequentially sampling an input signal at a Nyquist rate;

means for storing the N most recent of the samples;

means operative at times corresponding to the sampling by said sampling means for utilizing said stored sampled values for generating N Walsh coefficients of the sampled input signal;

means for multiplying each generated $n^{th}$ Walsh coefficient by $(-1)^n$, $n$ being an indexing integer having the values 0, 1, 2, . . . N–1; and means for forming the weighted sum of the outputs from said multiplying means.

2. A filter of the type described in claim 1 wherein said weighted sum forming means includes means for independently weighting each multiplying means output.

3. A filter of the type described in claim 1 wherein said Walsh coefficients generating means is a fast Walsh transform circuit.

4. A circuit for generating the $n^{th}$ running Walsh filter coefficient of an input signal comprising:

means for sequentially sampling the input signal at a Nyquist rate;

means for storing the N most recent of the samples;

means operative at times corresponding to the sampling by said sampling means for utilizing said stored sampled values to generate the $n^{th}$ Walsh coefficient of the input signal for the time window represented by the N–1 stored samples, $n$ being an indexing integer having the values 0, 1, 2 . . . N; and means for multiplying each generated Walsh coefficient by $(-1)^n$.

5. A filter of the type described in claim 4 wherein said Walsh coefficients generating means is a fast Walsh transform circuit.

6. A circuit for generating the $n^{th}$ running Walsh filter coefficient of an input signal comprising:

means for sequentially sampling said input signal at a Nyquist rate so as to provide N input signal samples where n is an indexing integer having the values 0, 1, 2 . . . N–1; and means operative during each sampling interval for performing convolution summation between the $n^{th}$ Walsh function and said sampled input signal, each of said summations yielding the $n^{th}$ Walsh filter coefficient for a selected time window of said input signal.

7. A circuit of the type described in claim 6 including means for commutatively storing the most recent of said N samples, said samples defining said time window.

8. A filter of the type described in claim 6 wherein said means for performing convolution summation includes means for generating N Walsh coefficients of the sampled input, and means for multiplying each generated Walsh coefficient by $(-1)^n$.

9. A Walsh function filter comprising:

means for sequentially sampling an input signal at a Nyquist rate;

means operative during each sampling interval for performing convolution summation between a corresponding set of Walsh functions and said sampled input signal, each of said summations yielding a set of coefficients; and means for forming the weighted sum of each of said sets of coefficients.

10. A filter of the type described in claim 9 wherein said weighted sum forming means includes means for independently weighting each coefficient yielded by said convolution summation means.

11. A filter of the type described in claim 9 wherein said convolution summation means includes means for generating N Walsh coefficients of the sampled input, and means for multiplying each generated $n^{th}$ Walsh coefficient by $(-1)^n$ where n is an indexing integer having the values 0, 1, 2 . . . N–1.

12. A filter of the type described in claim 9 including means for commutatively storing the N most recent of said samples.

* * * * *